United States Patent
Yoon et al.

(10) Patent No.: US 8,211,565 B2
(45) Date of Patent: Jul. 3, 2012

(54) SECONDARY BATTERY FOR MEDIUM AND LARGE SIZE BATTERY MODULE

(75) Inventors: Junill Yoon, Seoul (KR); Jong-yul Ro, Seoul (KR); Seungjae You, Daejeon (KR); Jisang Yu, Daejeon (KR); John E. Namgoong, Daejeon (KR)

(73) Assignee: LG Chem, Ltd., Seoul (KR)

( * ) Notice: Subject to any disclaimer, the term of this patent is extended or adjusted under 35 U.S.C. 154(b) by 723 days.

(21) Appl. No.: 12/436,556

(22) Filed: May 6, 2009

(65) Prior Publication Data

US 2009/0211082 A1  Aug. 27, 2009

Related U.S. Application Data

(63) Continuation of application No. 11/555,541, filed on Nov. 1, 2006, now abandoned.

(30) Foreign Application Priority Data

Nov. 2, 2005 (KR) .................. 10-2005-0104038

(51) Int. Cl.
*H01M 10/38* (2006.01)
(52) U.S. Cl. ........ 429/123; 429/121; 429/158; 429/160; 429/178
(58) Field of Classification Search ............. 429/120, 429/121, 123, 158, 160, 178, 181
See application file for complete search history.

(56) References Cited

U.S. PATENT DOCUMENTS 2,666,800 A * 1/1954 Hoynes ................. 429/121
2003/0170535 A1 * 9/2003 Watanabe et al. .......... 429/158

* cited by examiner

*Primary Examiner* — Patrick Joseph Ryan
*Assistant Examiner* — Ben Lewis
(74) *Attorney, Agent, or Firm* — Birch, Stewart, Kolasch & Birch, LLP

(57) ABSTRACT

Disclosed herein is a secondary battery for medium-sized or large-sized battery modules. The secondary battery is assembled while an electrically connecting member used at the time of manufacturing a battery module is previously welded to at least one of electrode terminals of the secondary battery.

5 Claims, 3 Drawing Sheets

SECONDARY BATTERY FOR MEDIUM AND LARGE SIZE BATTERY MODULE

CROSS REFERENCE TO RELATED APPLICATIONS

This application is a continuation of pending U.S. patent application Ser. No. 11/555,541, filed on Nov. 1, 2006, the contents of which are incorporated herein by reference in its entirety.

FIELD OF THE INVENTION

The present invention relates to a secondary battery for medium- or large-sized battery modules, and, more particularly, to a secondary battery that can be assembled while an electrically connecting member used at the time of manufacturing a battery module is previously welded to at least one of electrode terminals of the secondary battery.

BACKGROUND OF THE INVENTION

Recently, a secondary battery, which can be charged and discharged, has been widely used as an energy source for wireless mobile devices. Also, the secondary battery has attracted considerable attention as an energy source for electric vehicles and hybrid electric vehicles, which have been developed to solve problems, such as air pollution, caused by existing gasoline and diesel vehicles using fossil fuel.

Small-sized mobile devices use one or several small-sized unit cells for each device. On the other hand, medium- or large-sized devices, such as vehicles, use a medium- or large-sized battery module having a plurality of unit cells electrically connected with each other because high output and large capacity are necessary for the medium- or large-sized devices.

Based on their external shape, the unit cells are generally classified into a cylindrical battery, a prismatic battery, and a pouch-shaped battery. The pouch-shaped battery has been increasingly used since the pouch-shaped battery can be stacked with high integration, the shape of the pouch-shaped battery can be easily modified, the weight of the pouch-shaped battery is small, and the manufacturing costs of pouch-shaped battery are low.

Generally, the pouch-shaped battery is manufactured by placing an electrode assembly including cathodes, anodes, and separators in a pouch-shaped sheet and sealing the pouch-shaped sheet. The pouch-shaped battery includes electrode terminals constructed by welding pluralities of electrode taps protruding from electrode collectors to corresponding electrode leads. When a battery module is manufactured using pouch-shaped batteries as unit cells, electrode terminals of the pouch-shaped batteries are welded to bus bars to accomplish the electrical connection between the pouch-shaped batteries.

FIG. 1 is a typical view illustrating a part of a process for manufacturing a battery module using pouch-shaped batteries according to a conventional art.

Referring to FIG. 1, a cathode terminal 4 of a pouch-shaped battery 1 is connected to an anode terminal 5a of a neighboring pouch-shape battery 1a via a bus bar 6 so as to accomplish the electrical connection between the pouch-shaped batteries 1 and 1a. The cathode terminal 4 of a pouch-shaped battery 1 is constituted by a cathode lead welded to cathode taps 3 protruding from a cathode collector 2. In the pouch-shaped battery 1 with the above-described structure, the cathode lead 4 has the same purpose as the cathode lead welded to the cathode taps 3. Accordingly, the electrode terminals will be also referred to as the electrode leads in the following description.

The pouch-shaped batteries 1 and 1a must be electrically connected with each other so as to manufacture a battery module. To this end, the bus bar 6 is connected to the cathode terminal 4 of the pouch-shaped battery 1 and the anode terminal 5a of pouch-shaped battery 1a by welding. It is preferable that the electrical connection between the pouch-shaped batteries be accomplished by welding since the contact resistance between the electrode terminals 4 and 5a and the bus bar 6 is minimized.

Generally, the cathode terminal 4 of the pouch-shaped battery 1 is made of aluminum. The anode terminal 5a of pouch-shaped battery 1a is made of copper. The bus bar 6 is mainly made of copper. However, welding between different materials is not as satisfactory as compared to welding between the same materials. This is because the interior of the battery is damaged due to heat generated during welding, or the quality of welding is deteriorated.

In order to solve the above-mentioned problem, some conventional arts have proposed technologies for performing welding, while materials having high thermal conductivity are temporarily in contact with the lower ends of regions where the electrode leads 4 and 5a are connected with the bus bar 6 by welding, such that high heat generated from the welding regions is prevented from being conducted into the battery 1. However, these technologies complicate a process for assembling a battery module, which increases the manufacturing costs of the battery module.

SUMMARY OF THE INVENTION

Therefore, the present invention has been made to solve the above problems, and other technical problems that have yet to be resolved.

Specifically, it is an object of the present invention to provide a secondary battery wherein transmission of heat generated by welding into the secondary battery is minimized, and the quality of welding is high.

It is another object of the present invention to provide a secondary battery wherein the secondary battery is assembled while a connecting member is previously welded to a corresponding electrode terminal of the secondary battery.

It is yet another object of the present invention to provide a battery module constructed using such secondary batteries.

In accordance with one aspect of the present invention, the above and other objects can be accomplished by the provision of a secondary battery for medium- or large-sized battery modules, wherein the secondary battery is assembled while an electrically connecting member used at the time of manufacturing a battery module is previously welded to at least one of electrode terminals of the secondary battery.

Preferably, the secondary battery is a pouch-shaped secondary battery having an electrode assembly mounted in a pouch-shaped sheet case including a high-polymer resin layer and a metal layer.

The electrode assembly is constructed in a cathode/separator/anode structure. The cathode is provided at one end thereof with cathode taps protruding from a cathode collector. The anode is provided at one end thereof with anode taps protruding from an anode collector. The cathode taps and the anode taps are disposed at one end of the electrode assembly while the cathode taps and the anode taps are spaced apart from each other.

In the present invention, the electrode terminals may be the electrode taps themselves. Alternatively, the electrode terminals may be electrode leads, i.e., cathode and anode leads, welded to the electrode taps. When the electrode terminals are the electrode taps themselves, a plurality of electrode taps are directly welded to an electrically connecting member. When the electrode terminals are the electrode leads, an electrode lead is welded to an electrically connecting member while a plurality of electrode taps are welded to the electrode lead.

The connecting member may have various shapes. The shape of the connecting member is not particularly restricted so long as the electrical connection between the connecting member and an electrode terminal of a neighboring unit cell and/or the electrical connection between the connecting member and an external input and output terminal is easily accomplished at the time of manufacturing a battery module.

In the present invention, kinds of welding are not particularly restricted. For example, ultrasonic welding, laser welding, spot welding, and seam welding may be used.

In a preferred embodiment, the connecting member is a bus bar, which can be easily welded. The connecting member is coupled to an electrode terminal from which relatively high heat is generated during welding and/or which is needed to be welded for a relatively long period of time.

For example, when a cathode terminal of a pouch-shaped secondary battery is made of aluminum, an anode terminal of the secondary battery is made of copper, and a bus bar is made of copper, it is preferable to assemble the secondary battery after the bus bar is welded to the cathode terminal. This is because, when two different metals are welded to each other, relatively high heat is needed and/or welding time is increased due to the different melting points of the metals, and therefore, a lot of heat is generated during welding. In other words, the battery is assembled, while the bus bar is previously welded to the electrode terminal from which high heat is generated, in order to minimize the transmission of heat generated at the time of welding into the battery.

Generally, a cathode terminal of a pouch-shaped secondary battery is made of aluminum, an anode terminal of the secondary battery is made of copper, and a bus bar is made of copper. Consequently, it is preferable to previously weld the bus bar to the cathode terminal at the time of assembling the battery.

The connecting member may be provided at one end thereof with a connection coupling part, which is electrically connected to an external input and output terminal.

Preferably, the connection coupling part may be a protruding member having a thread formed on the outer surface or the inner surface thereof. The former protruding member is constructed in a bolt structure, and the latter protruding member is constructed in a nut structure. Consequently, the connection coupling part can be easily coupled to a region having a structure corresponding to the connection coupling part, for example, an external input and output terminal connection region.

According to circumstances, unit cells may be assembled while the connecting member is connected to an electrode terminal of a neighboring unit cell. Specifically, first and second unit cells may be assembled while a connecting member is welded to a cathode terminal of the first unit cell and an anode terminal of the second unit cell.

In accordance with another aspect of the present invention, there is provided a battery module constructed using the above-described pouch-shaped secondary battery as a unit cell.

The battery module may be used in a medium- or large-sized battery pack including combination of two or more batteries. The medium- or large-sized battery pack may be used in a medium-sized device, such as a laptop computer, as well as a large-sized device, such as an electric vehicle or a hybrid electrical vehicle.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
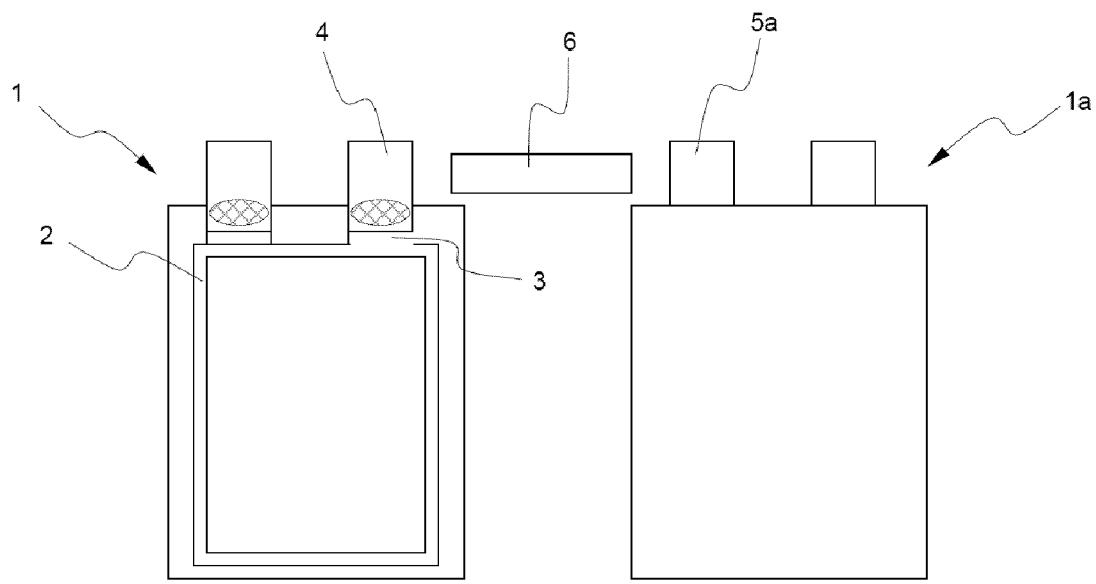
FIG. 1 is a typical view illustrating a process for manufacturing a battery module using pouch-shaped batteries according to a conventional art.
Figure 2:
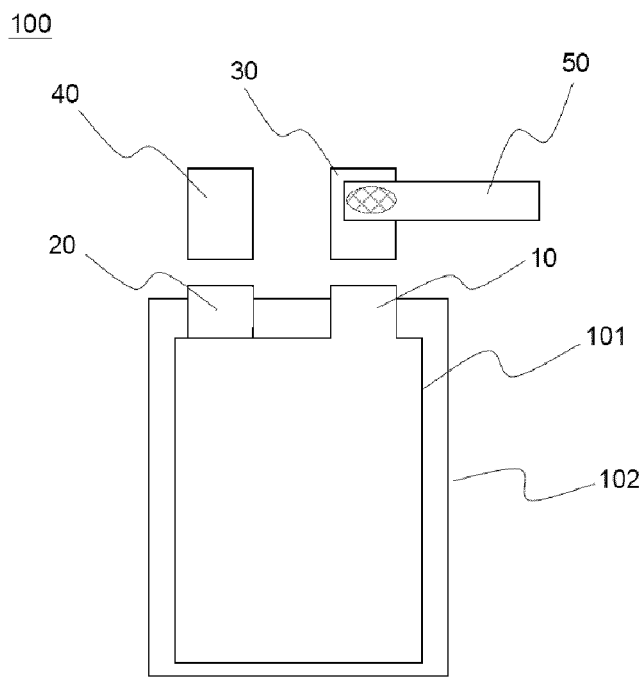
FIG. 2 is a typical view illustrating a secondary battery for medium- or large-sized battery modules according to a preferred embodiment of the present invention.
Figure 3:
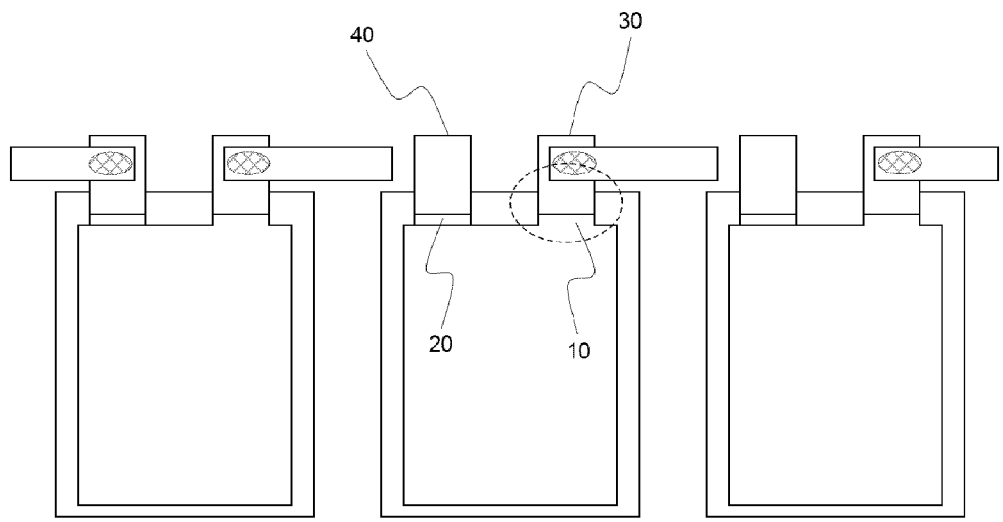
FIG. 3 is a typical view illustrating a part of a process for assembling a secondary battery by connecting electrode leads of the secondary battery, to at least one of which a connecting member is previously welded as shown in FIG. 2, to electrode taps.

FIG. 2 is a typical view illustrating a secondary battery according to a preferred embodiment of the present invention, and FIG. 3 is a typical view illustrating a part of a process for assembling a secondary battery by connecting electrode leads to corresponding electrode taps.

Referring to FIGS. 2 and 3, a pouch-shaped secondary battery 100 is constructed in a structure in which an electrode assembly 101 is mounted in a pouch-shaped sheet case 102 in a sealed state. According to the conventional art, a plurality of cathode taps 10 protruding from a cathode collector of the electrode assembly 101 are first welded to a cathode lead 30. According to the present invention, on the other hand, a plurality of cathode taps 10 protruding from a cathode collector of the electrode assembly 101 are welded to a cathode lead 30, to which a bus bar 50 is previously welded. Specifically, welding between the cathode lead 30 and the bus bar 50 is performed, and then welding between the cathode lead 30 and the cathode taps 10 is performed. On the other hand, a plurality of anode taps 20 protruding from an anode collector is welded to an anode terminal 40.

The cathode taps 10 and the cathode lead 30 of the pouch-shaped secondary battery 100 are made of aluminum. The anode taps 20 and the anode lead 40 of the pouch-shaped secondary battery 100 are made of copper. The bus bar 50 is made of copper. Welding between the cathode terminal 30 and the bus bar 50, which are made of different materials, is first performed (see a dotted-line ellipse). As a result, high heat generated during the welding between the cathode terminal 30 and the bus bar 50 is prevented from being transmitted to an electrode collector 102 via the cathode taps 10.

Figure 4:
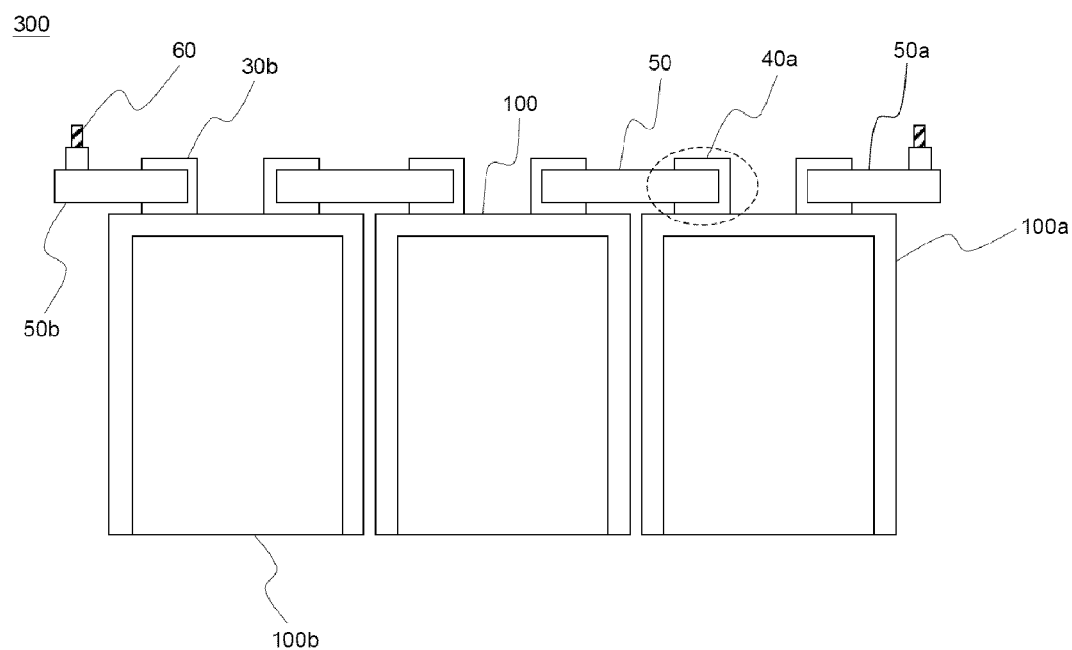
FIG. 4 is a typical view illustrating a part of a process for electrically connecting the secondary batteries of FIG. 3 with each other to manufacture a battery module.

FIG. 4 is a typical view illustrating a part of a process for electrically connecting the pouch-shaped secondary batteries of FIG. 3 with each other to manufacture a battery module.

Referring to FIG. 4, a bus bar 50, which is previously welded to a cathode terminal 30 of a unit cell 100, is welded to an anode terminal 40a of a neighboring unit cell 100a (see a dotted-line ellipse) so as to manufacture a battery module 300.

Bus bars 50a and 50b, which are welded to electrode leads 30a and 40b of unit cells 100a and 100b disposed at opposite sides of the battery module 300, are provided with connection coupling parts 60, which are coupled to external input and output terminals (not shown). The connection coupling parts 60 are constructed in a bolt structure. Consequently, when the external input and output terminals (not shown) are constructed in a nut structure, the connection coupling parts 60 can be easily coupled to the external input and output terminals.

Figure 5:
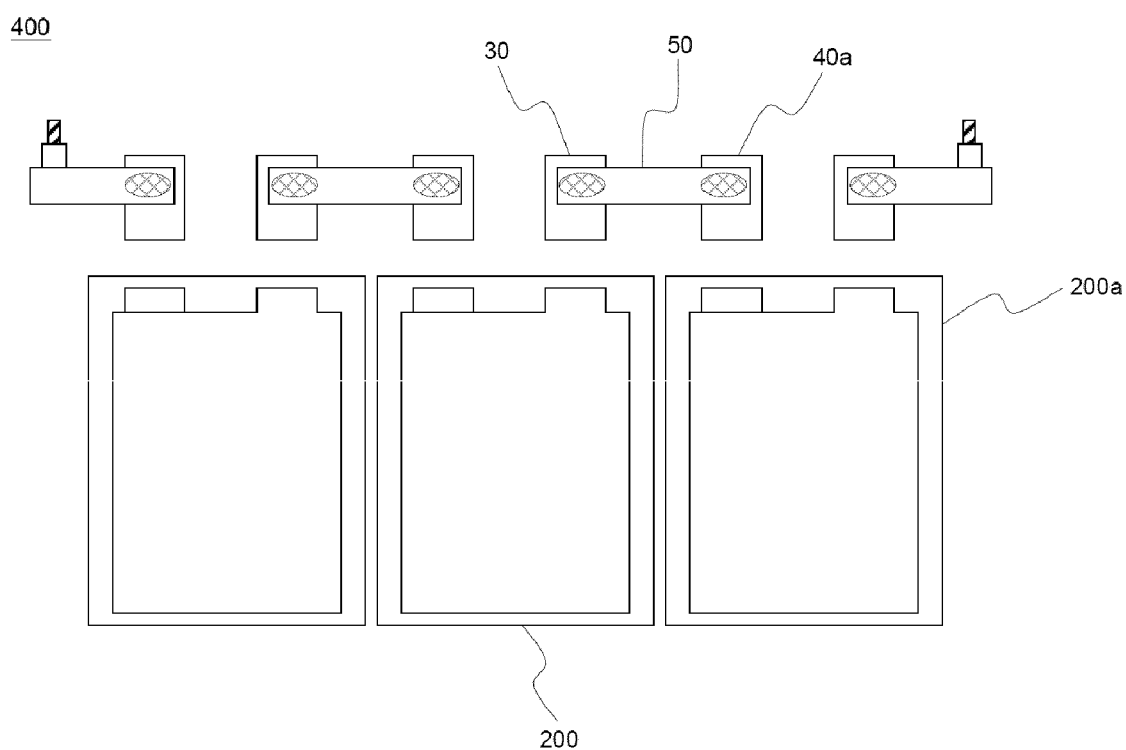
FIG. 5 is a typical view illustrating a part of a process for assembling secondary batteries for medium- or large-sized battery modules according to another preferred embodiment of the present invention.

FIG. 5 is a typical view illustrating a part of a process for manufacturing a battery module using secondary batteries according to another preferred embodiment of the present invention as unit cells.

Referring to FIG. 5, pouch-shaped batteries 200 and 200a are assembled while two electrode leads 30 and 40a are previously welded to a bus bar 50. Specifically, the bus bar 50 is previously welded to the cathode lead 30 of the battery 200. The bus bar 50 is also previously welded to the anode lead 40a of the neighboring battery 200a. When the batteries 200 and 200a are assembly using the bus bar 50, the battery module 400 is manufactured in the same structure as the battery module 300 of FIG. 4.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, a battery is assembled while an electrically connecting member essentially used at the time of manufacturing a medium- or large-sized battery module is previously welded to an electrode terminal, which is needed to be welded at high temperature and/or for a long period of time. Consequently, the present invention has the effect of minimizing transmission of high heat generated by welding at the time of manufacturing the battery module into the battery.

What is claimed is:

1. A method for manufacturing a secondary battery, comprising:
    welding a cathode lead to a bus bar when the cathode lead is not coupled to the secondary battery to avoid transferring heat energy to the secondary battery during the welding of the cathode lead to the bus bar, the cathode lead being constructed of a first type of metal, the bus bar being constructed from a second type of metal different than the first type of metal; and
    welding the cathode lead to a cathode tap of the secondary battery after welding the cathode lead to the bus bar, the cathode tap being constructed of the first type of metal.

2. The method of claim 1, wherein the first type of metal is aluminum.

3. The method of claim 1, wherein the second type of metal is copper.

4. The method of claim 1, wherein the secondary battery has a pouch-shaped sheet case.

5. A method for manufacturing a secondary battery, comprising:
    welding an aluminum cathode lead to a copper bus bar when the aluminum cathode lead is not coupled to the secondary battery to avoid transferring heat energy to the secondary battery during the welding of the aluminum cathode lead to the copper bus bar; and
    welding the aluminum cathode lead to an aluminum cathode tap of the secondary battery, after welding the aluminum cathode lead to the copper bus bar.

* * * * *